US009708137B2

(12) United States Patent
Lykov

(10) Patent No.: US 9,708,137 B2
(45) Date of Patent: Jul. 18, 2017

(54) METHOD AND APPARATUS FOR MOVING LOADS

(71) Applicant: WATERBOX OY, Lahti (FI)

(72) Inventor: Evgeny Lykov, Metsakyla (FI)

(73) Assignee: WATERBOX OY, Lahti (FI)

( * ) Notice: Subject to any disclaimer, the term of this patent is extended or adjusted under 35 U.S.C. 154(b) by 44 days.

(21) Appl. No.: 14/442,482

(22) PCT Filed: Nov. 14, 2012

(86) PCT No.: PCT/FI2012/051107
§ 371 (c)(1),
(2) Date: May 13, 2015

(87) PCT Pub. No.: WO2014/076350
PCT Pub. Date: May 22, 2014

(65) Prior Publication Data
US 2015/0344241 A1    Dec. 3, 2015

(51) Int. Cl.
| | |
|---|---|
| B65G 51/01 | (2006.01) |
| B63H 19/00 | (2006.01) |
| B63H 23/22 | (2006.01) |
| B65G 51/04 | (2006.01) |
| E02C 5/02 | (2006.01) |

(52) U.S. Cl.
CPC ............. *B65G 51/01* (2013.01); *B63H 19/00* (2013.01); *B63H 23/22* (2013.01); *B65G 51/04* (2013.01); *E02C 5/02* (2013.01)

(58) Field of Classification Search
CPC ............ E02C 5/02; B65G 51/01; B65G 51/04
See application file for complete search history.

(56) References Cited

U.S. PATENT DOCUMENTS

| 448,072 | A | 3/1891 | Pickard |
|---|---|---|---|
| 3,390,530 | A | 7/1968 | Toben |
| 3,398,540 | A | 8/1968 | Toben |
| 3,930,450 | A | 1/1976 | Symons |

(Continued)

FOREIGN PATENT DOCUMENTS

| CN | 101787688 A | 7/2010 |
|---|---|---|
| CN | 203079320 U | 7/2013 |

(Continued)

OTHER PUBLICATIONS

International Search Report, dated Jul. 10, 2013, from corresponding PCT application.

(Continued)

*Primary Examiner* — Tara M. Pinnock
(74) *Attorney, Agent, or Firm* — Young & Thompson

(57) ABSTRACT

A method and an apparatus (1, 11, 21, 31) for moving one or more loads (5, 15, 25, 35a, 35b, 45), in which method loads are moved along a channel (2, 12, 22, 32a, 32b, 49, 49') on or in fluid, wherein the channel (2, 12, 22, 32a, 32b, 49, 49') extending substantially horizontally in lengthwise direction has a cross-section, which cross-section defines an open section (13, 33a, 33b) and a closed section (14, 34a, 34b), wherein the fluid in the open section is directly in contact with surrounding air, and the fluid in the channel can flow from the open section to the closed section and vice versa through opening or openings located below the surface level of the fluid in the open section, and the load or loads (5, 15, 25, 35a, 35b, 45) are moved by floating them at least partially inside the closed section.

16 Claims, 3 Drawing Sheets

(56) References Cited

Figure 1:
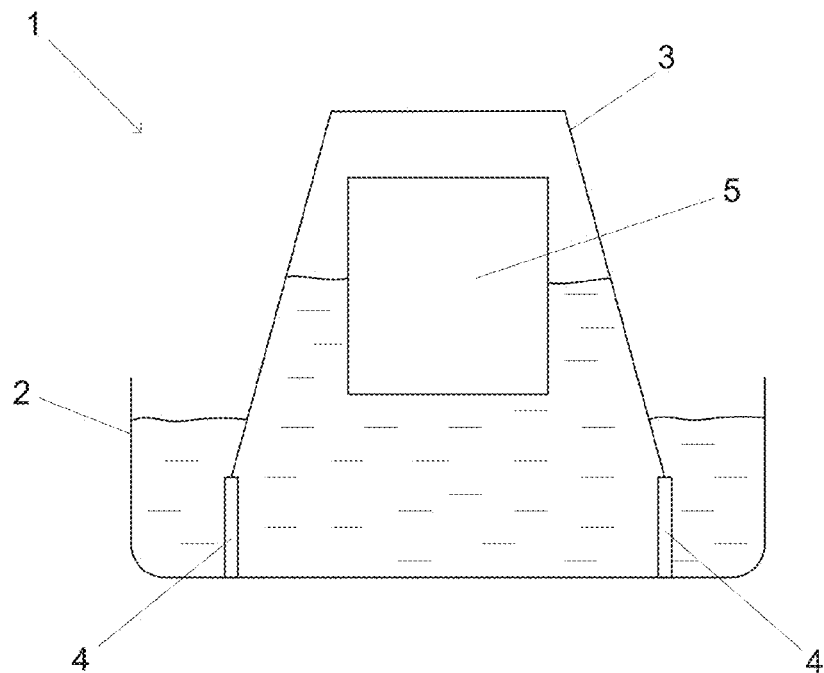

U.S. PATENT DOCUMENTS 5,860,364 A 1/1999 McKoy
2015/0344241 A1 12/2015 Lykov

FOREIGN PATENT DOCUMENTS

| DE | 102007003018 A | 12/2008 |
|----|----------------|---------|
| SU | 622926 A1 | 9/1978 |
| SU | 1117381 A | 10/1984 |
| WO | 2010134866 A1 | 11/2010 |

OTHER PUBLICATIONS

Chinese Office Action, dated Jun. 15, 2016, from corresponding Chinese Patent Application No. 2012800770388.

METHOD AND APPARATUS FOR MOVING LOADS

BACKGROUND OF THE INVENTION

Field of the Invention

The present invention relates to moving different kinds of loads. More precisely the invention relates to a method and an apparatus for moving loads on or in fluid.

Description of the Related Art

Moving loads, such as articles, materials, and people, for example, on water with boats or other vessels is well known. This moving of loads along waterways has always been affected by weather, especially by storms and winter conditions, for example.

SUMMARY OF THE INVENTION

The present invention provides a solution for moving loads along a prefabricated channel, where the effects of weather, among others, can be minimized, and the energy used for moving the loads can be minimized.

In the present invention one or more loads are moved along a channel on or in fluid, such as water for example, which channel extends substantially horizontally in lengthwise direction and which channel has a cross-section defining an open section and a closed section, wherein the fluid in the open section is directly in contact with surrounding air, and the fluid in the channel can flow from the open section to the closed section and vice versa through opening or openings located below the surface level of the fluid in the open section. The closed section of the channel is used for moving the load or loads by floating them at least partially inside the closed section of the channel.

In this context the definition "floating" is used in its broadest form comprising floating on the surface of fluid and floating in fluid below the surface level of the fluid, as well as all possible variations between these two.

Preferably the fluid used in the present invention is water. Oil and other liquids, as well as different mixtures of liquids may also be used. Further, the fluid used in the present invention needs to be heavier than the surrounding air, so that it is possible to create a partial vacuum or overpressure inside the closed section of the channel.

Inside of the closed section of the channel, in the area above the surface level of the fluid, is preferably created partial vacuum or overpressure. Partial vacuum inside the closed section of the channel raises the fluid surface level inside the closed section above the fluid surface level in the open section of the channel. Correspondingly, the overpressure inside the closed section of the channel lowers the fluid surface level inside the closed section below the fluid surface level in the open section of the channel.

The load or loads floated inside the closed section of the channel are preferably moved by creating a fluid flow at least inside the closed section of the channel, and/or with suitable propulsion means connected to the load or to means for floating the load. The fluid flow within the channel can be created with propellers or turbines, or with height difference between portions or ends of the channel, for example.

The floating of the load may be achieved with separate barges, or by packing the load to be moved in a floating container, for example.

Advantageously the channel is equipped with suitable means for providing magnetic fields, which magnetic fields are used for providing levitation and/or propulsion forces for the load or loads. These means may comprise permanent and/or electronic magnets, for example.

The fluid in the embodiments of the present invention may also comprise oil. This way the viscosity of the fluid can be changed to be suitable for different solutions, for example.

The solution according to the present invention may also comprise a vertically extending portion connecting two channels at different heights. This vertically extending portion is used to move load or loads vertically upwards and/or downwards between these two channels by raising and lowering the fluid surface level in the vertically extending portion.

More precisely the features defining a method according to the invention are disclosed in claim 1, and the features defining an apparatus according to the invention are disclosed in claim 8.

BRIEF DESCRIPTION OF THE DRAWING FIGURES

Figure 2:
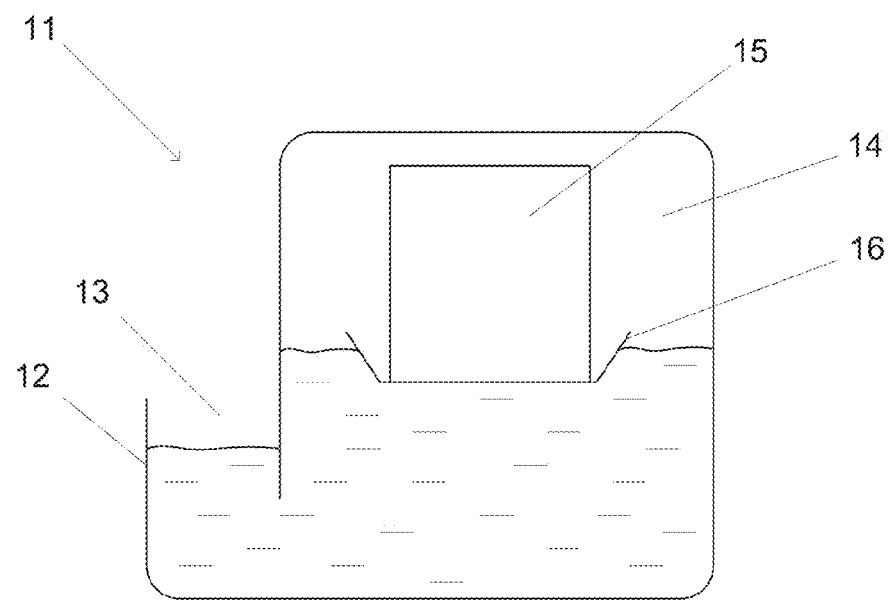
Figure 3:
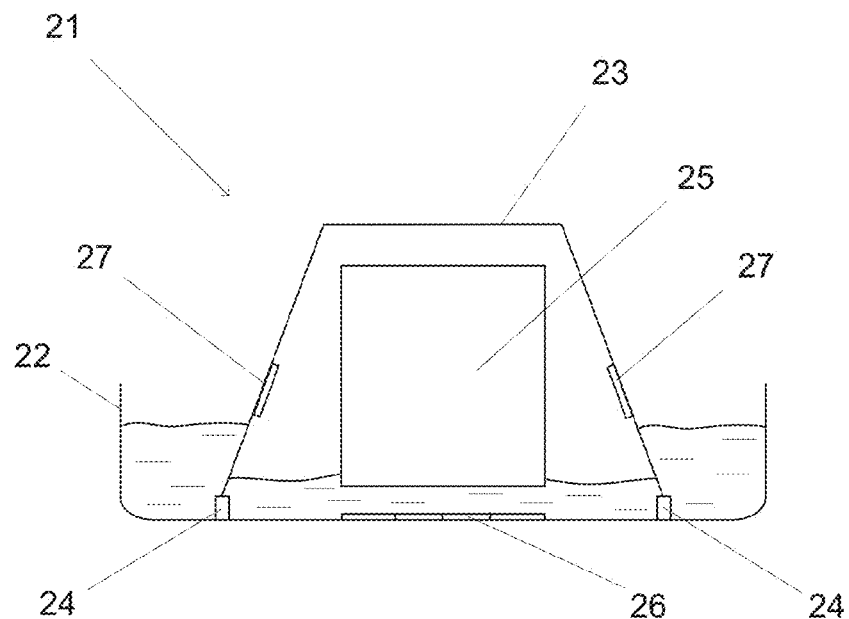
Figure 4:
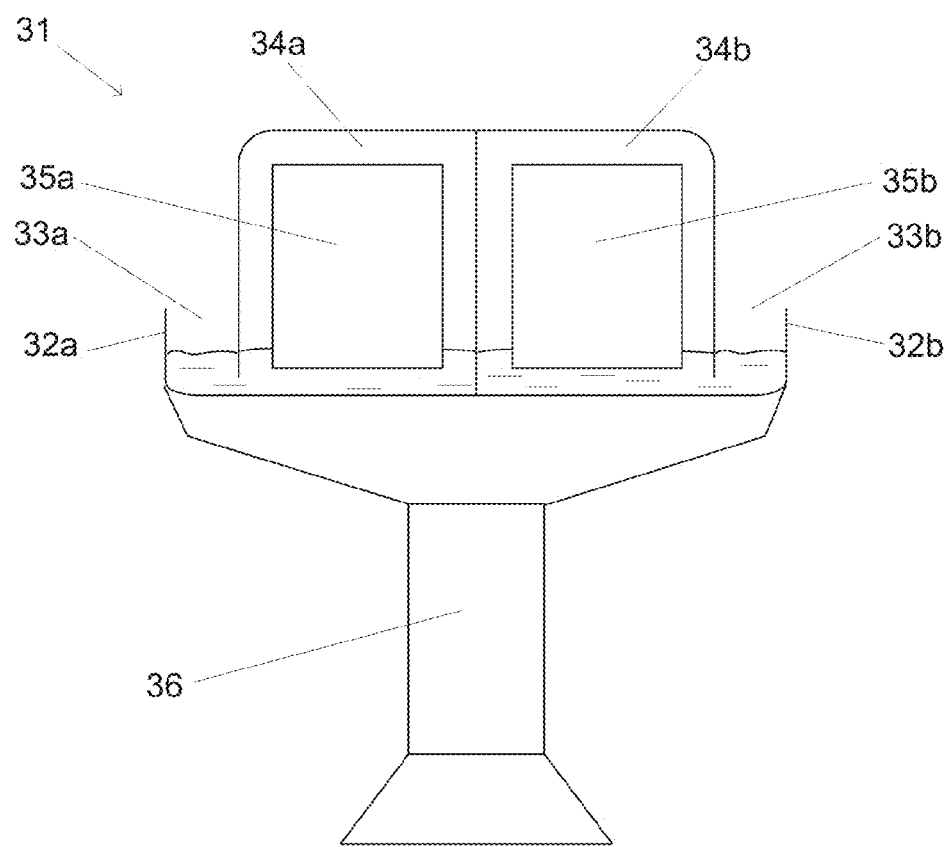
Figure 5A:
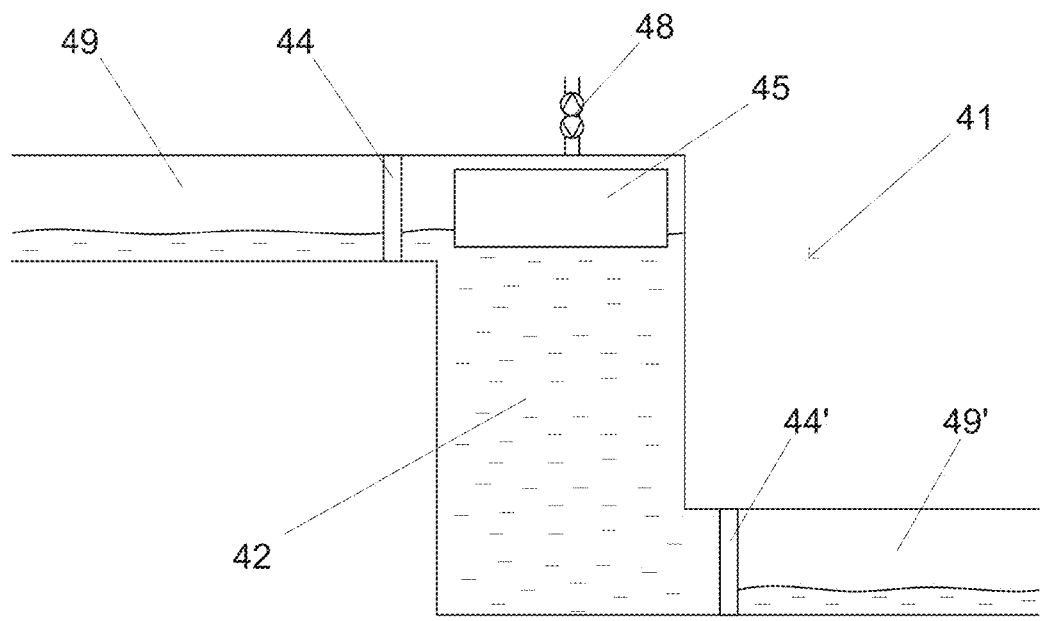
Figure 5B:
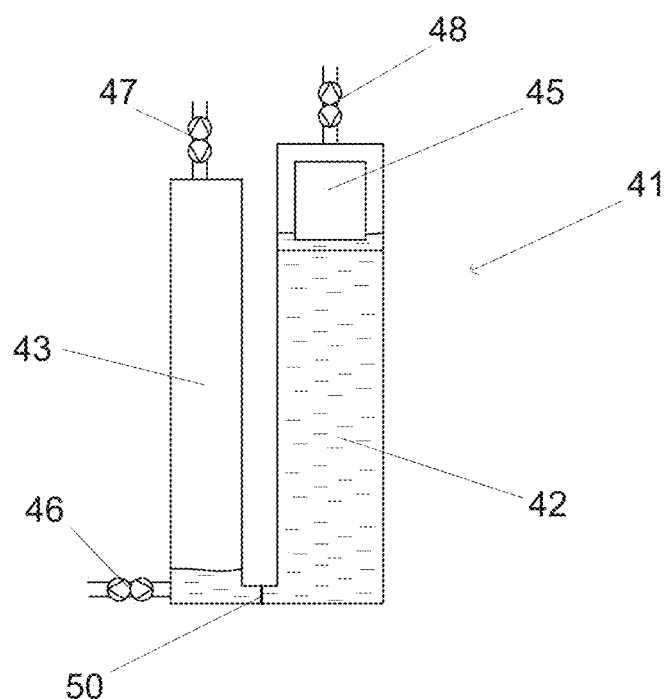

Exemplifying embodiments of the invention and their advantages are explained in greater detail below in the sense of example and with reference to accompanying drawings, where:

FIG. 1 shows schematically a cross-sectional view of an apparatus according to an embodiment of the invention, FIG. 2 shows schematically a cross-sectional view of an apparatus according to an alternative embodiment of the invention, FIG. 3 shows schematically a cross-sectional view of an apparatus according to an alternative embodiment of the invention, FIG. 4 shows schematically a cross-sectional view of an apparatus according to the invention comprising two channels, and FIGS. 5A and 5B show one solution for moving loads to be transported upwards in an apparatus according to the invention.

DETAILED DESCRIPTION OF THE INVENTION

FIG. 1 shows schematically a cross section of an apparatus 1 for moving loads according to an embodiment of the invention, which apparatus comprises a channel 2, a vessel 3, supports 4, and a load 5 to be moved.

The channel 2 is substantially horizontal and extends in lengthwise direction. The channel 2 is also at least partially filled with water and has open top surface, so that the water in the channel is in direct contact with the surrounding atmosphere and air.

A vessel 3 is located at least partially inside the channel 2, which vessel extends substantially horizontally in lengthwise direction along the channel. The vessel 3 has open bottom surface and is fixed on the bottom of the channel 2 with supports 4 so that the main portion of the vessel is located above the surface level of the water in the channel, and the open bottom surface of the vessel is located below the surface level of the water in channel. The supports 4 do not extend along the all length of the vessel 3, but support the vessel only on suitable locations, so that water has free access from inside the vessel to outside and vice versa.

The apparatus 1 is equipped with suitable means, such as suction pumps (not shown) for example, for creating partial vacuum inside the vessel 3. This partial vacuum inside the vessel 3 causes the water surface level inside the vessel to rise higher that the surrounding water surface level in the channel 2, since the water has free access from outside to inside the vessel and the pressure affecting the surface of the water outside the vessel is greater than the pressure affecting water surface inside the vessel.

Load 5 to be moved according to the invention is floated inside the vessel 3 from one location to another along the channel 2. In order to achieve the flotation of the load 5, the load is either packed into a suitable floating means, such in a barge for example, or the load itself is equipped with flotation means, such as pontoons for example. The movement of the load 5 is either achieved with water flow created at least inside the vessel 3 or by providing the load or its flotation means with suitable propulsion means, such as motor rotating a propeller for example.

The apparatus 1 according the invention is also equipped with suitable means for moving the load 5 inside the vessel 3 at least at one point along the channel 2, and means for removing the load from inside the vessel 3 at least at one point along the channel 2. These means may be for example a branch in vessel 3, which branch can be connected and disconnected from the inner portion of the vessel 3 with a sliding airtight door, for example. In this way the branch can be opened to outer atmosphere for moving the load 5 inside the branch, then the branch may be sealed and a partial vacuum can be created inside the branch, and when the partial vacuum inside the branch corresponds to the partial vacuum of the vessel 3, the connecting sliding airtight door or surface can be opened and the load can be floated inside the vessel, after which the sliding airtight door is closed again for a new load for example. The branch can be used in opposite order for removing loads 5 from the vessel 3, for example.

FIG. 2 shows schematically a cross-sectional view of an apparatus 11 for moving loads 15 according to an alternative embodiment of the invention.

In this embodiment the whole cross-section of a channel 12 extending substantially horizontally in lengthwise direction is formed as a single part or piece, where the edges of the cross-section are horizontally spaced apart, and vertically the outer edge is located higher than the inner edge. This way an open section 13 and closed section 14 is formed in the channel 12 by the cross-section of the channel.

In order to being able to create partial vacuum inside the closed section 14 of the channel 12, the water surface level of the open section 13 of the channel must be in vertical direction between the outer edge and the inner edge of the cross-section of the channel. In other words, the inner edge of the cross-section of the channel needs to be below the water surface levels of both the open section 13 and the closed 14 section of the channel. Further, the inner edge of the cross-section is a distance away from the bottom on the channel 12, so that that water can move between the open section and closed section of the channel.

For raising the water surface level inside the closed section 14 of the channel 12, partial vacuum is created inside the area restricted by the walls of the cross-section of the channel and the water surface inside the closed section of the channel. Alternatively overpressure can be created, or normal pressure kept inside the closed section 14 of the channel 12, which will correspondingly affect the water surface level in the closed section.

In the embodiment of FIG. 2, the load 15 is moved inside the closed section 14 of the channel by floating it on water surface with a barge 16. The barge 16 may be equipped with a motor with a propeller for moving the barge, or the barge can be moved inside the closed section 14 by a flowing movement of water inside the closed section.

FIG. 3 shows a cross-section of an apparatus 21 according to an embodiment of the invention, which apparatus comprises a channel 22 and a vessel 23 extending along the channel and being supported with supports 24 on the bottom of the channel so that the edges of the vessel are located below the surface level of the fluid in the channel and a distance from the bottom of the channel. The fluid is in this case preferably water or other liquid.

In the embodiment of FIG. 3, the bottom of the channel 22 is equipped with means for creating magnetic fields, such as electric or permanent magnets 26, which are located in the area of the vessel 23, and which extend along the length of the vessel and/or channel. The magnets 26 create magnetic fields below load 25, and together with metallic material of the container of the load, and/or with magnets fixed in the container of the load, magnetic levitation of the load is achieved, which levitation decrease the floating depth of the load in the water. This helps to minimize the water drag caused to the load when it is floated along the channel.

In the inner surfaces of the vessel 23 is connected magnetic means for creating magnetic fields, such as electric magnets 27. These magnets 27, together with metallic material of the container of the load 25, and/or with magnets fixed in the container of the load, are used to create propulsion for the load to move the load along the apparatus 21.

The electric magnets 26 in this embodiment may be switched on and off when the load 25 proceeds along the apparatus 1, but the electric magnets 27 must be switched on and off when the load proceeds for creating suitable propulsion for the load. This switching on and off of the magnets may be initiated with suitable sensors, for example, or other solutions known to a person skilled in the art.

As can be seen from FIG. 3, where the water surface level inside the vessel 23 is lower than what the water surface level in the channel 22, there is over-pressure inside the vessel 23 in this embodiment. Further, in this embodiment thick oil may be mixed in the water, which raises the viscosity and thickness of the water, which allows the load 25, when moved at a suitable speed, to rise on the surface of the water and thus greatly minimize the drag caused by the water.

FIG. 4 shows a cross-section of an apparatus 31 according to the invention, where two channels 32a and 32b are formed side by side. In this embodiment, the closed sections 34a and 34b of the channels 32a and 32b are side by side, and the open sections 33a and 33b are located on the sides of the apparatus 31.

In the embodiment of FIG. 4, the apparatus 31 also comprises support construction 36, which is used to raise the channels 32a and 32b above the ground level. This allows construction of the apparatus according to the invention also in the areas, which are already built. The raising of the channels also allows easy creation of fluid flow inside the channels, whereby the channels may be tilted in suitable angle, for example.

As can be seen from FIG. 4, there is normal pressure inside both of the closed sections 34a, 34b of the channels 32a, 32b. However, overpressure or partial vacuum may also be created inside the closed sections 34a, 34b.

The embodiment of FIG. 4 allows simultaneous transporting of loads 35a and 35b to different directions, for example. Alternatively, for example during rush times, both of the channels 32a and 32b can be used, or the other channel's transporting direction can be changed, to transport the loads 35a and 35b to same direction.

FIGS. 5A and 5B show one solution for moving load 45 to be transported upwards in an apparatus according to the invention. FIG. 5A shows a lengthwise cross-sectional view and FIG. 5B shows a cross-sectional view of the solution. The solution comprises lifting portion 41, which extends in vertical direction, and is connected from one side of the lower end to a channel 49' with a watertight door 44', and from the opposite side of the upper end to another, vertically higher channel 49 with another watertight door 44.

The lifting portion 41 comprises channel portion 42, to which the load 45 to be lifted is guided, and a reservoir portion 43, which is used to raise and lower fluid, preferably water, surface level in the channel portion 42.

When the load 45 arrives to the lifting portion 41 along the lower channel 49', the fluid surface level inside the channel portion 42 is lowered to correspond to the fluid surface level inside channel 49'. This is achieved by opening a hatch 50, that opens and closes the fluid connection between the reservoir portion 43 and the channel portion 42, and by raising the air pressure inside the channel portion with pumps 48 and/or sucking partial vacuum inside the reservoir portion with pumps 47, which forces the fluid from channel portion to the reservoir portion. After the fluid surface level inside the channel portion 42 substantially corresponds with the fluid surface level inside the channel 49', the hatch 50 is closed, air pressure inside the channel portion is changed to correspond to the air pressure inside the channel, the watertight door 44' is opened, and the load 45 to be lifted is moved inside the channel portion.

Once the load 45 is inside the channel portion 42, the watertight door 44' is closed, which closes all fluid connections to the channel 49', the hatch 50 is opened, and fluid from the reservoir portion 43 is forced to the channel portion by raising the air pressure inside the reservoir portion with pumps 47 and/or by sucking partial vacuum inside the channel portion 42. When the fluid surface level inside the channel portion 42 reaches the fluid surface level inside the channel 49, the hatch 50 is closed, air pressure inside the channel portion is changed to correspond to the air pressure inside the channel, the watertight door 44 is opened, and the load 45 is moved to the channel 49.

The lifting portion 41 is preferably also equipped with fluid connection and pumps 46 for adding or removing fluid from the lifting portion.

The lifting portion 41 can, of course, also be used to move load 45 to other direction, meaning that the lifting portion can be used to transport the load downwards from higher channel 49 to lower channel 49'.

The specific examples provided in the description given above and in the attached figures should not be construed as limiting. Especially different features of different embodiments may be freely combined to form suitable new embodiments inside the scope of the attached claims. Therefore, the invention is not limited merely to the embodiments described above, but it can be modified in ways evident to a person skilled in the art within the scope of the attached claims.

The invention claimed is:

1. A method for moving one or more loads, in which method loads are moved along a channel on or in fluid, comprising:
   providing the channel extending substantially horizontally in a lengthwise direction, the channel having a cross-section in a plane perpendicular in relation to the substantially horizontal lengthwise direction of the channel, which cross-section defines an open section and a closed section in the same cross-section, wherein the fluid in the open section is directly in contact with surrounding air, and the fluid in the channel can flow from the open section to the closed section and vice versa through opening or openings located below a surface level of the fluid in the open section;
   moving the load or loads by floating load or loads at least partially inside the closed section; and
   creating partial vacuum or overpressure inside the closed section of the channel.

2. The method according to claim 1, wherein the fluid is water or oil.

3. The method according to claim 2, wherein the movement of the floated load or loads is achieved by creating a fluid flow at least inside the closed section of the channel.

4. The method according to claim 2, wherein the movement of the floated load or loads is achieved with the propulsion device connected to the load or loads or to the floatation device.

5. The method according to claim 1, wherein the step of moving comprises creating a fluid flow at least inside the closed section of the channel.

6. The method according to claim 1, wherein the step of moving comprises utilizing a propulsion device connected to the load or loads or to a floatation device.

7. The method according to claim 1, wherein step of moving comprises utilizing magnetic fields for providing levitation and/or propulsion forces for the load or loads.

8. The method according to claim 1, wherein the step of moving comprises moving the load or loads upwards and/or downwards between two channels at different heights in a vertically extending portion by gradually changing a fluid surface level in a vertically extending portion.

9. An apparatus for moving one or more loads, which apparatus comprises:
   a channel with fluid, wherein
      the channel extending substantially horizontally in a lengthwise direction has a cross-section, the cross section being in a plane perpendicular in relation to the substantially horizontal lengthwise direction of the channel which cross-section defines an open section and a closed section in the same cross-section, wherein the fluid in the open section is directly in contact with surrounding air, and the fluid in the channel can flow from the open section to the closed section and vice versa through opening or openings located below the surface level of the fluid in the open section,
   a flotation device floating the load or loads in the fluid and at least partially inside the closed section of the channel, and
   the apparatus comprises a vacuum or pressure source creating partial vacuum or overpressure inside the closed section of the channel.

10. The apparatus according to claim 9, wherein the fluid is water or oil.

11. The apparatus according to claim 10, wherein the apparatus comprises a device creating fluid flow at least inside the closed section of the channel.

12. The apparatus according to claim 9, wherein the apparatus comprises a device creating fluid flow at least inside the closed section of the channel.

13. The apparatus according to claim 9, floatation device comprises a propulsion device.

14. The apparatus according to claim 9, wherein the floatation device comprises a barge.

15. The apparatus according to claim 9, wherein the channel is equipped with a magnet.

16. The apparatus according to claim 9, wherein the apparatus further comprises a vertically extending portion connecting two channels at different heights, which portion is equipped with a device changing the fluid surface level in the vertically extending portion.

\* \* \* \* \*